United States Patent [19]

Diamond et al.

[11] Patent Number: 5,537,593
[45] Date of Patent: Jul. 16, 1996

[54] METHOD FOR SOLVING ENUMERATIVE SEARCH PROBLEMS USING MESSAGE PASSING ON PARALLEL COMPUTERS

[75] Inventors: Marc D. Diamond, Golden Valley; Jeffrey C. Kimbel, Forest Lake, both of Minn.

[73] Assignee: FMC Corporation, Chicago, Ill.

[21] Appl. No.: 65,505

[22] Filed: May 24, 1993

Related U.S. Application Data

[63] Continuation of Ser. No. 478,324, Feb. 12, 1990, abandoned.

[51] Int. Cl.⁶ .................................................. G06F 15/163
[52] U.S. Cl. .................... 395/650; 395/200.03; 395/800; 364/DIG. 1
[58] Field of Search ..................................... 395/200, 800, 395/200.03, 650

[56] References Cited

U.S. PATENT DOCUMENTS

| | | | |
|---|---|---|---|
| 4,210,962 | 7/1980 | Marsh et al. | 364/402 |
| 4,218,582 | 10/1980 | Hellman et al. | 380/30 |
| 4,466,060 | 10/1984 | Riddle | 395/200.15 |
| 4,495,559 | 1/1985 | Gelatt, Jr. et al. | 364/148 |
| 4,575,798 | 3/1986 | Lindstrom et al. | 395/600 |
| 4,583,164 | 4/1986 | Tolle | 395/600 |
| 4,719,571 | 1/1988 | Rissanen et al. | 395/600 |
| 4,837,735 | 6/1989 | Allen, Jr. et al. | 395/11 |
| 4,860,201 | 10/1989 | Stolfo et al. | 395/800 |
| 4,905,144 | 2/1990 | Hansen | 395/800 |
| 4,918,621 | 4/1990 | Nado et al. | 395/55 |
| 4,949,243 | 10/1990 | Mohamed Ali et al. | 395/405 |
| 4,982,340 | 1/1991 | Oyanagi et al. | 395/63 |
| 5,008,882 | 4/1991 | Peterson et al. | 370/94.3 |
| 5,072,379 | 12/1991 | Eberhardt | 364/402 |
| 5,170,393 | 12/1992 | Peterson et al. | 370/94.1 |

OTHER PUBLICATIONS

Dehne et al., "Parallel Branch and Bound on Fine–Grained Hypercube Multiprocessors," IEEE, 1989, pp. 616–622.

Megiddo, N. "Applying Parallel Computation Algorithms in the Design of Serial Algorithms", *Journal of the Association for Computing Machinery*, vol. 30, No. 4, Oct. 1983, pp. 852–865.

*Primary Examiner*—William M. Treat

[57] ABSTRACT

A method and apparatus for solving enumerative search, graph search or combinatorial optimization problems using parallel digital processors. Various nodes, representing decision points in the problem, are distributed among a plurality of digital processors. The nodes are expanded and bound values for the nodes are communicated among the processors. Non-productive solution parts are pruned to eliminate unnecessary expansion of the state space. Updated bound values are communicated in both directions along the search graph and a plurality of messages are developed to provide communication in a loosely coupled processor environment.

9 Claims, 18 Drawing Sheets

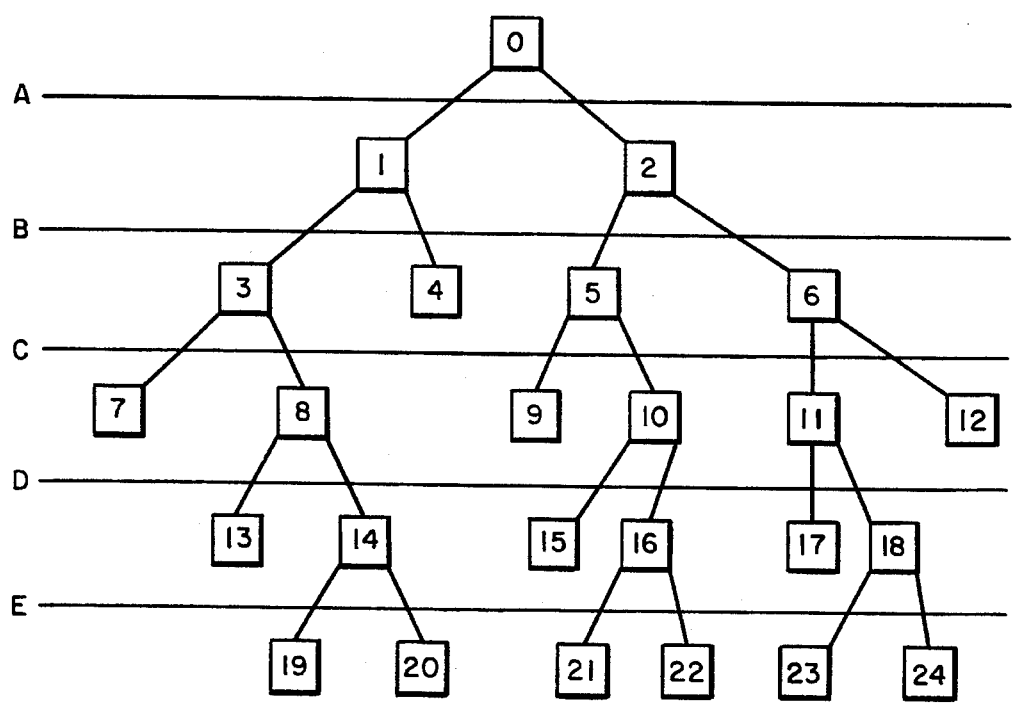
FIG_1
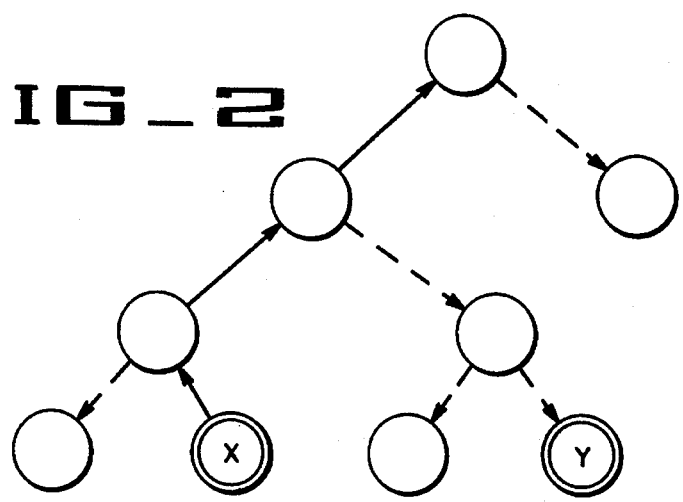
FIG_2
→ REEVALUATE UPWARD BOUND
--→ REEVALUATE DOWNWARD BOUND

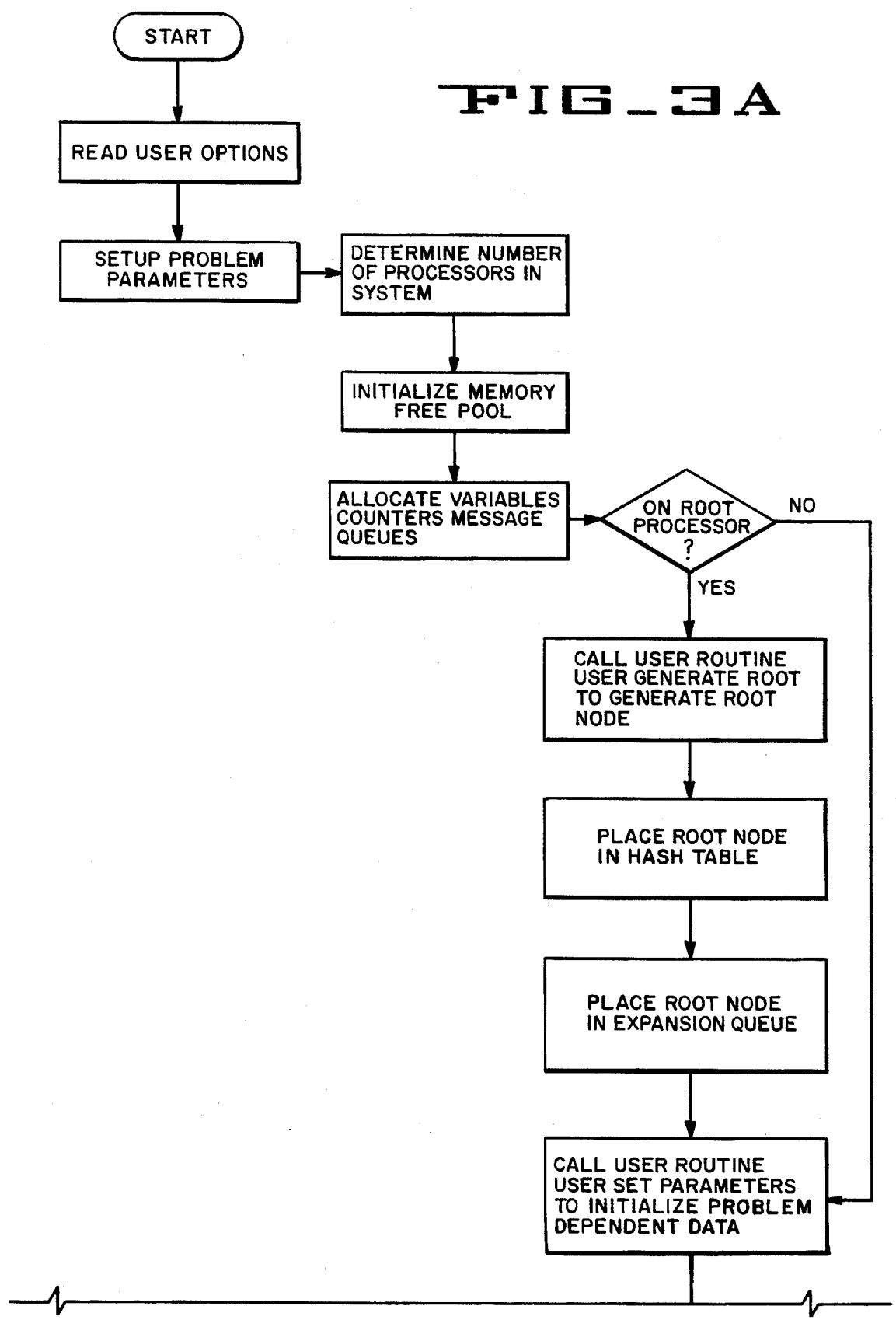
FIG_3A

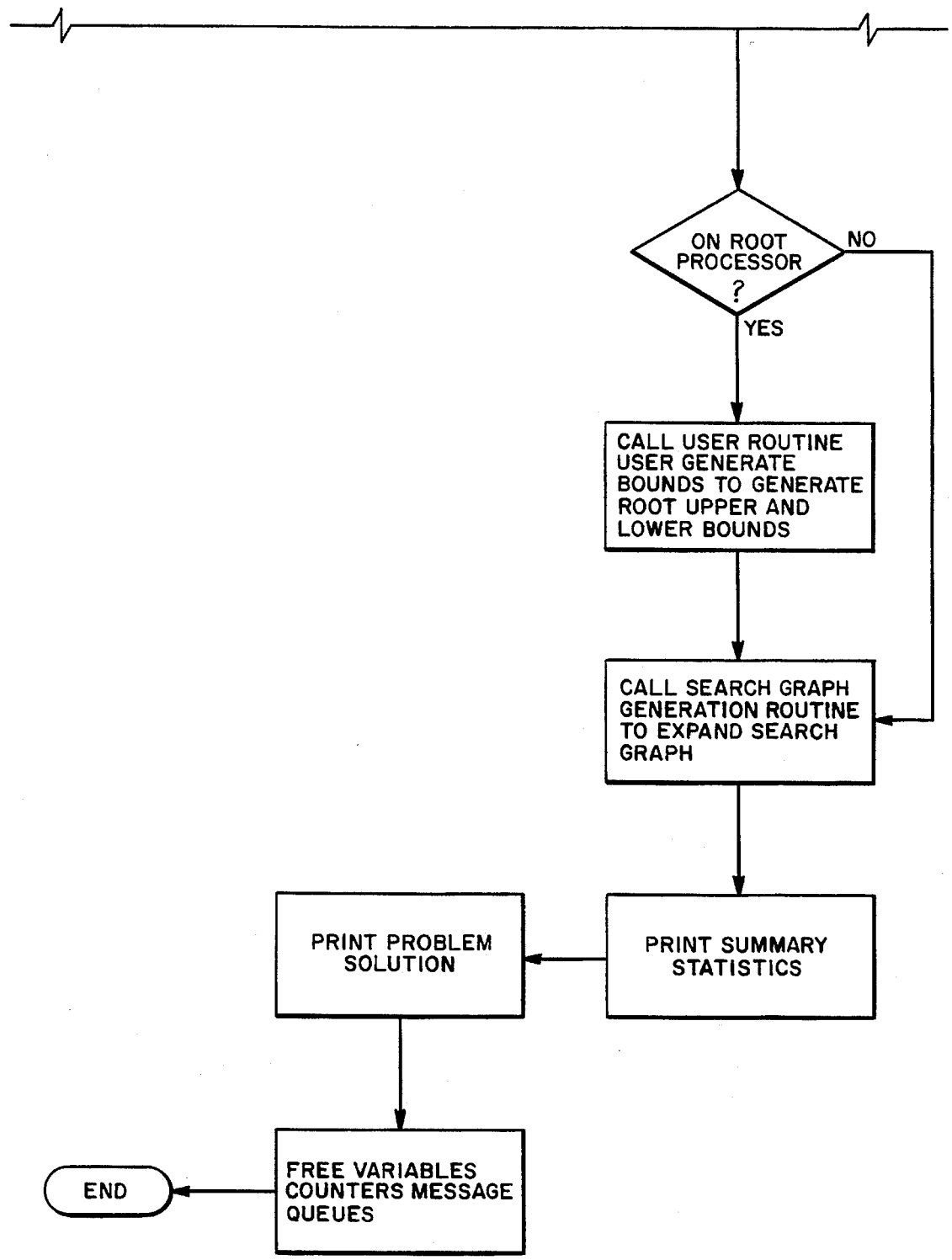
FIG_3B

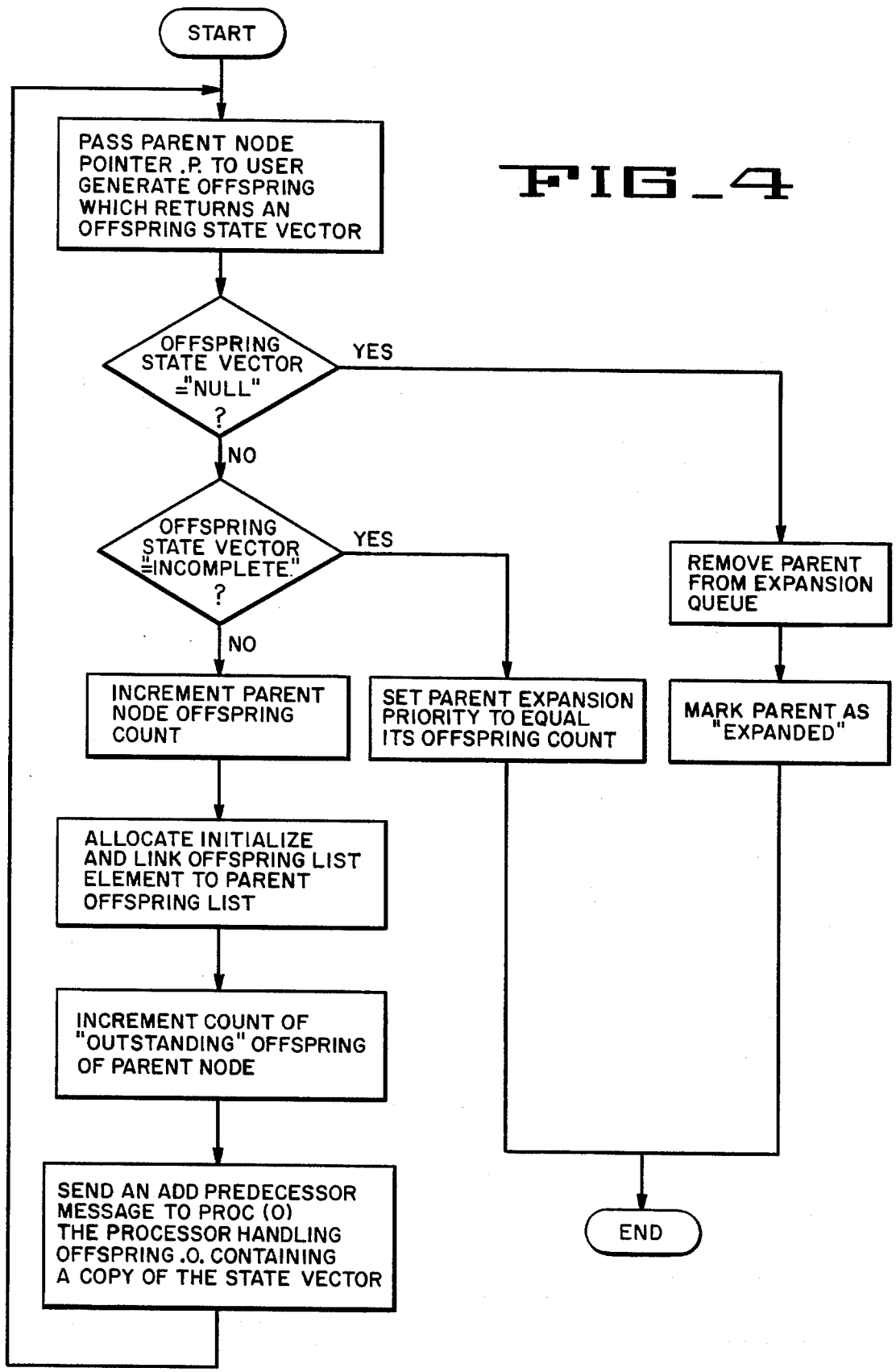

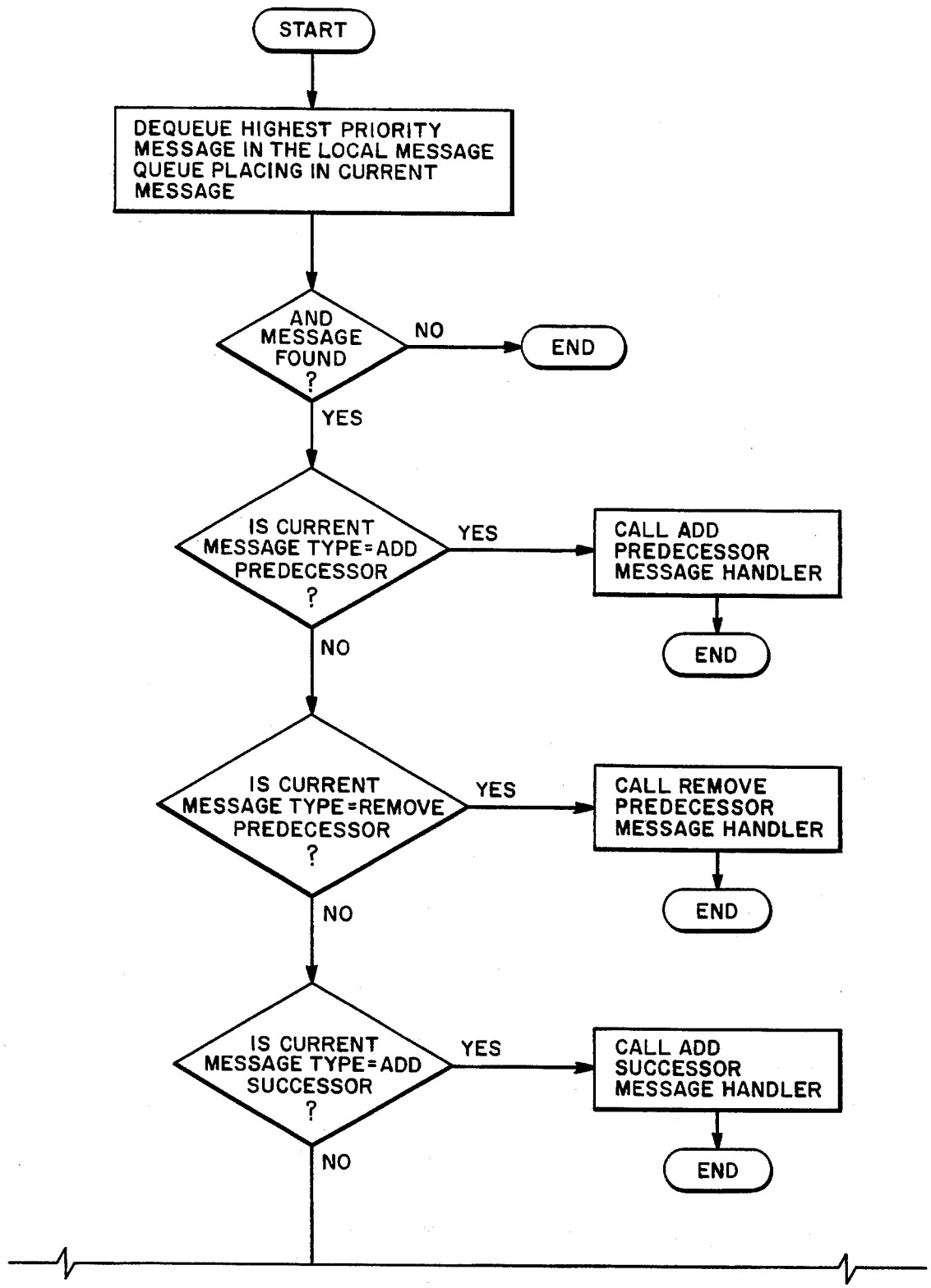
FIG_5A

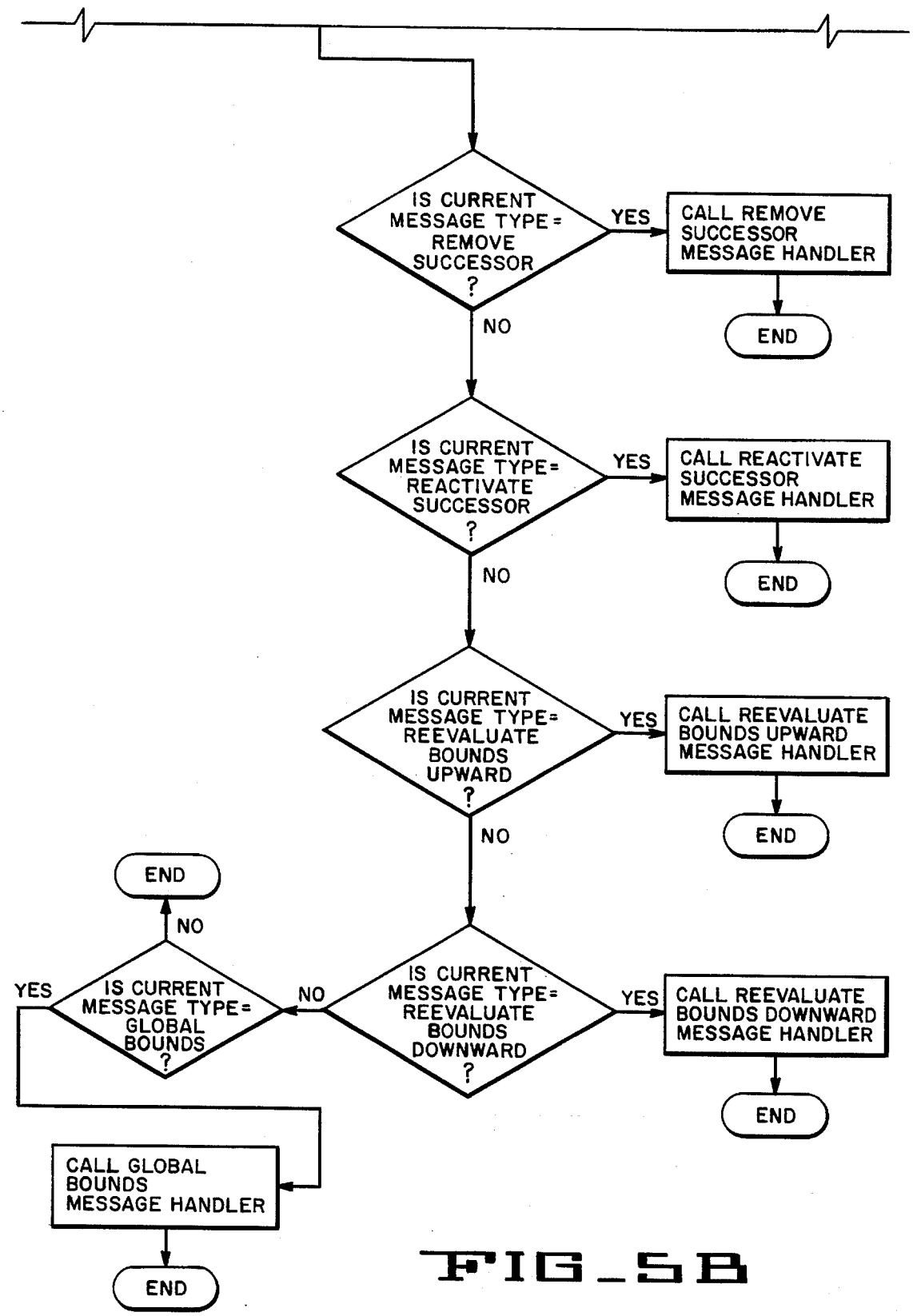
FIG_5B

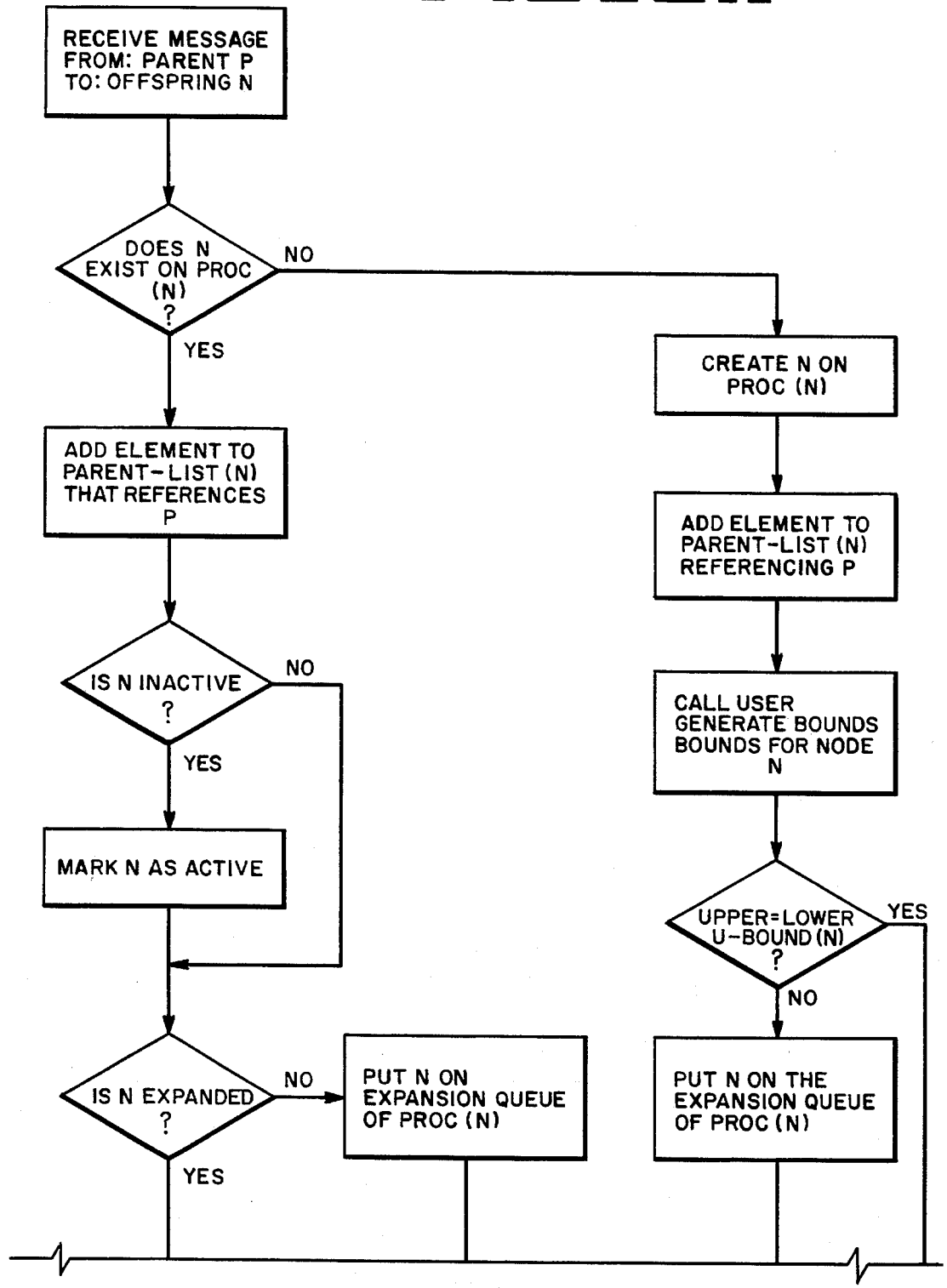
FIG_6A

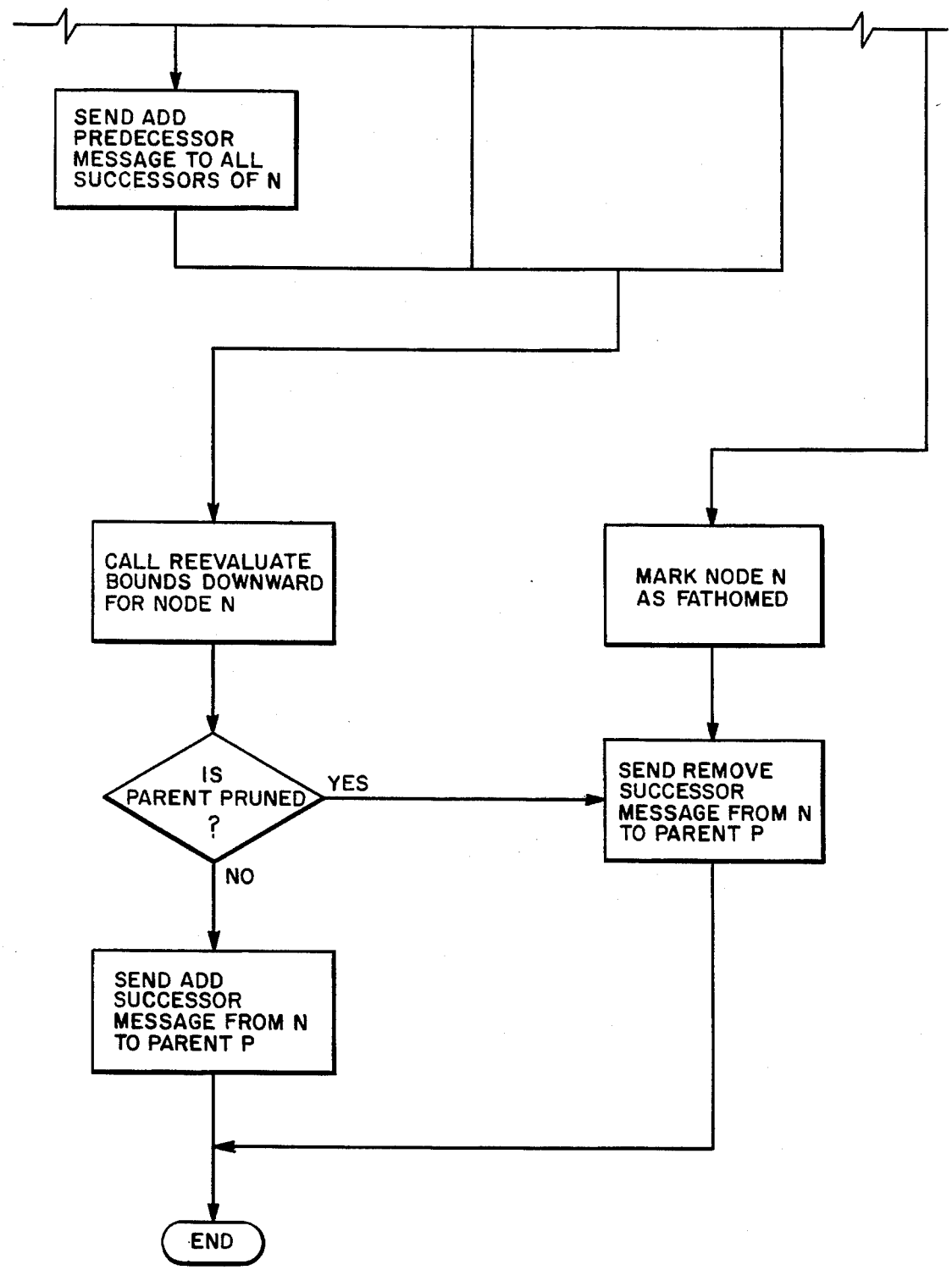
FIG_6B

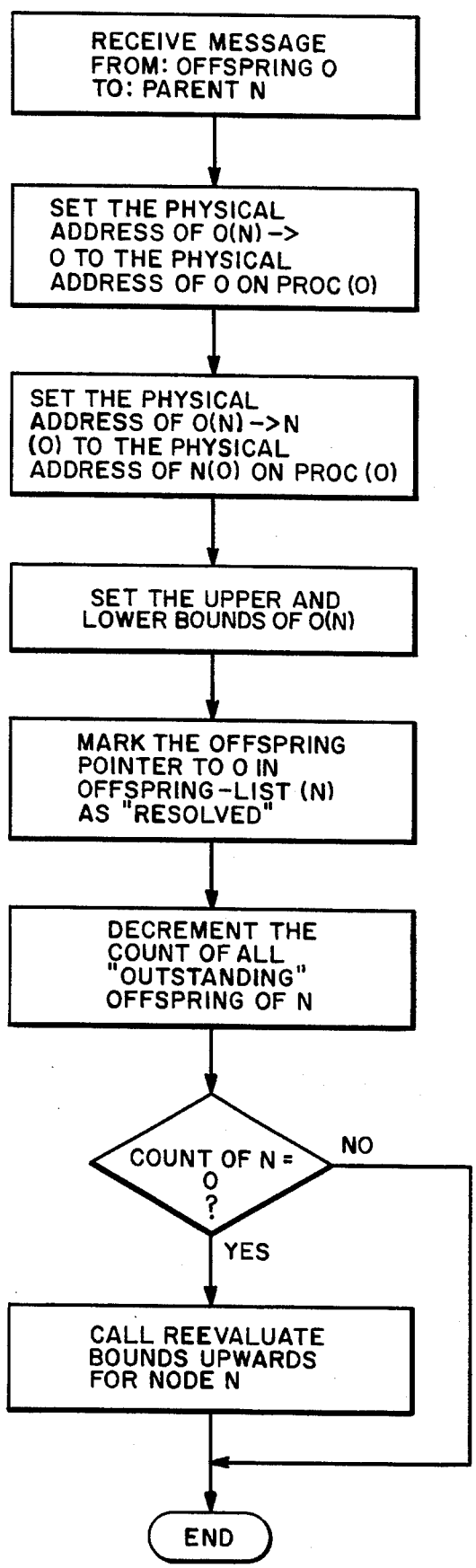
FIG_7
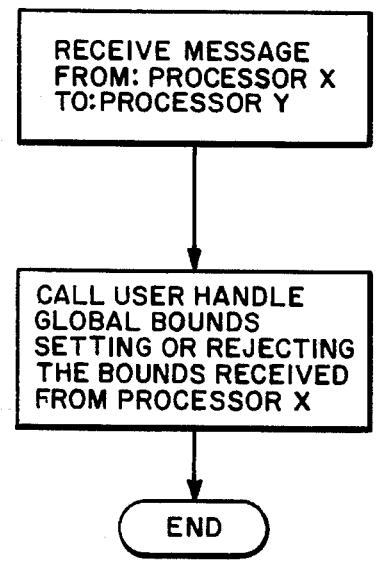
FIG_8

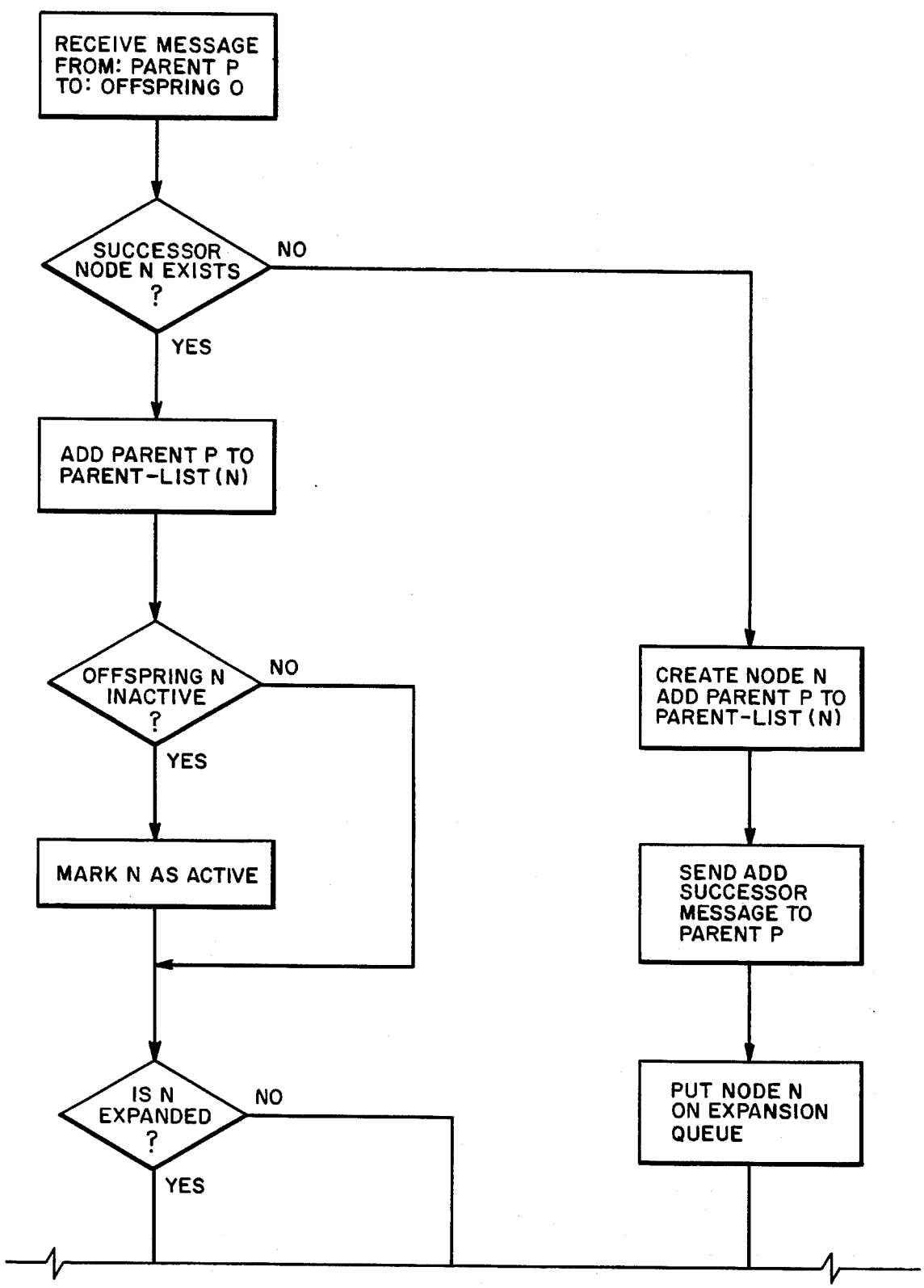
FIG_9A

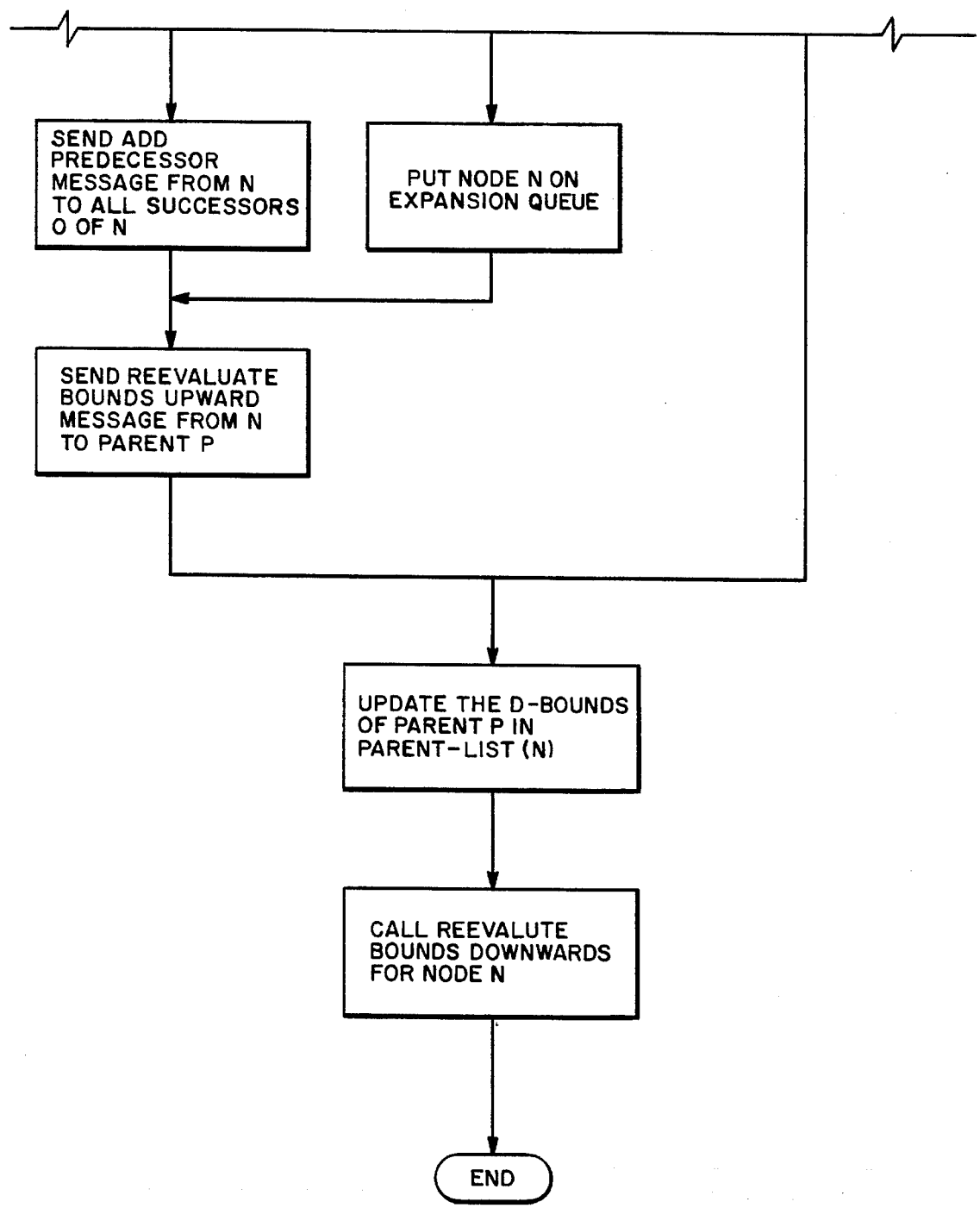
FIG_9B

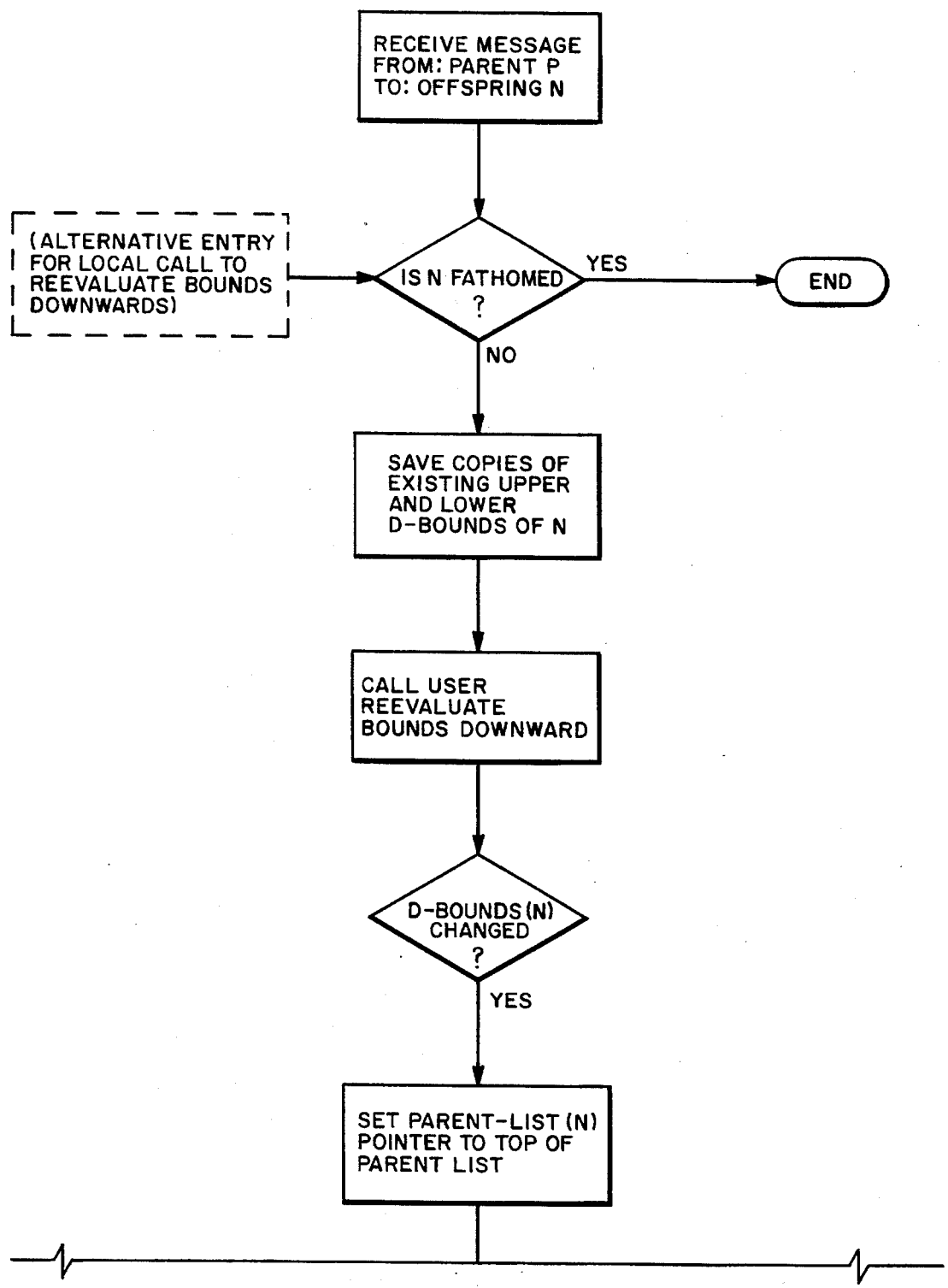
FIG_10A

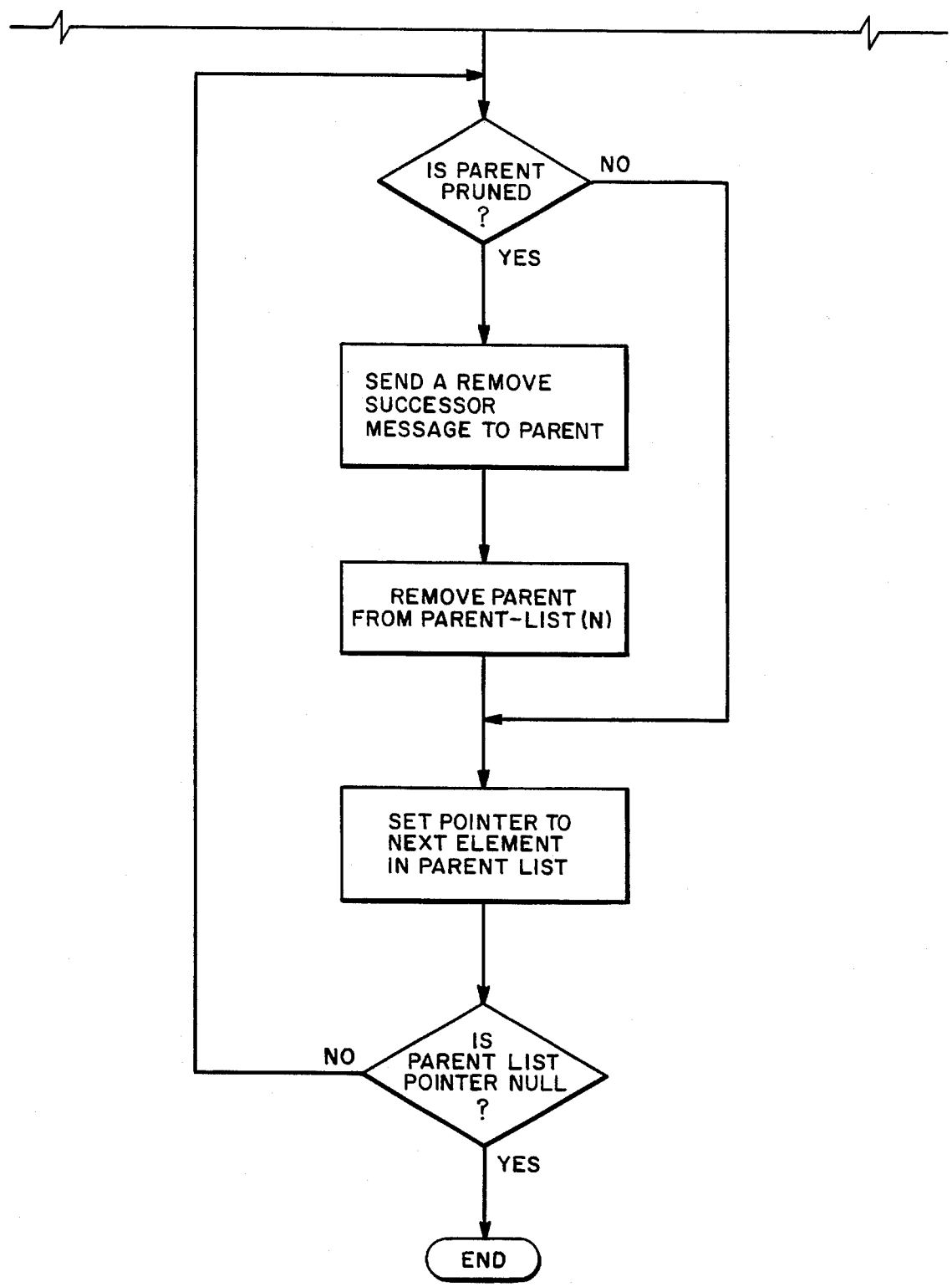
FIG_10B

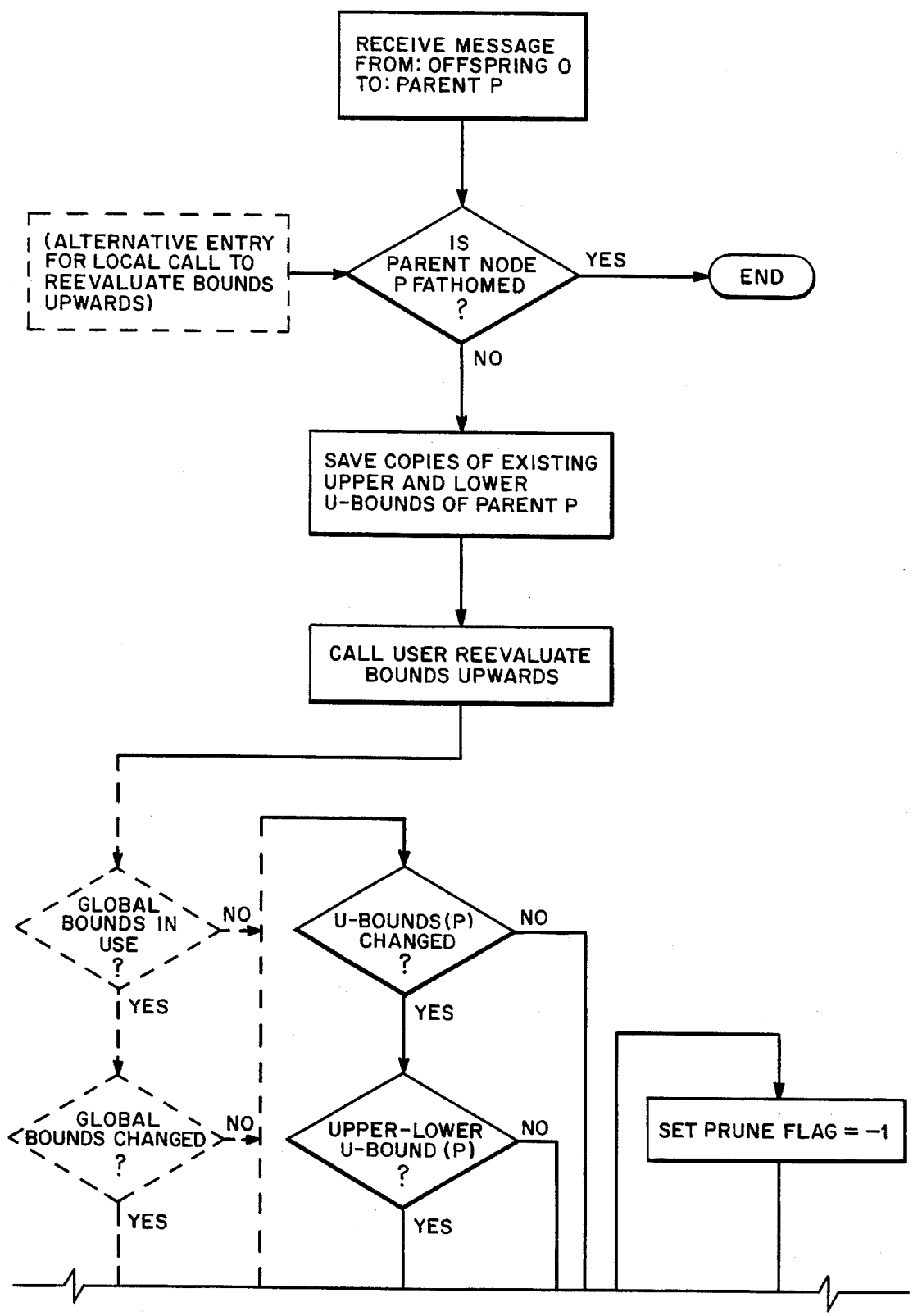
FIG_11A

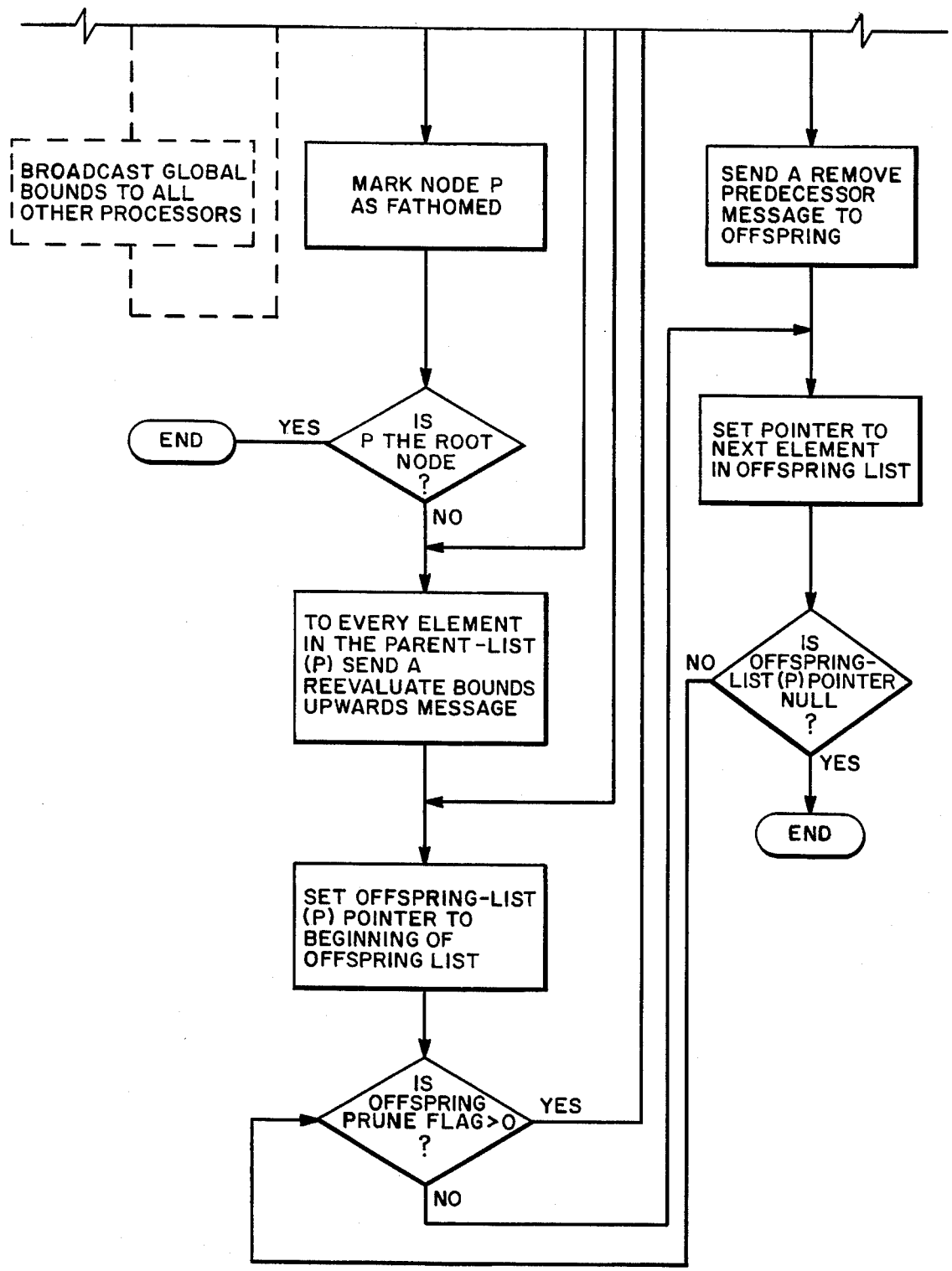
FIG_11B

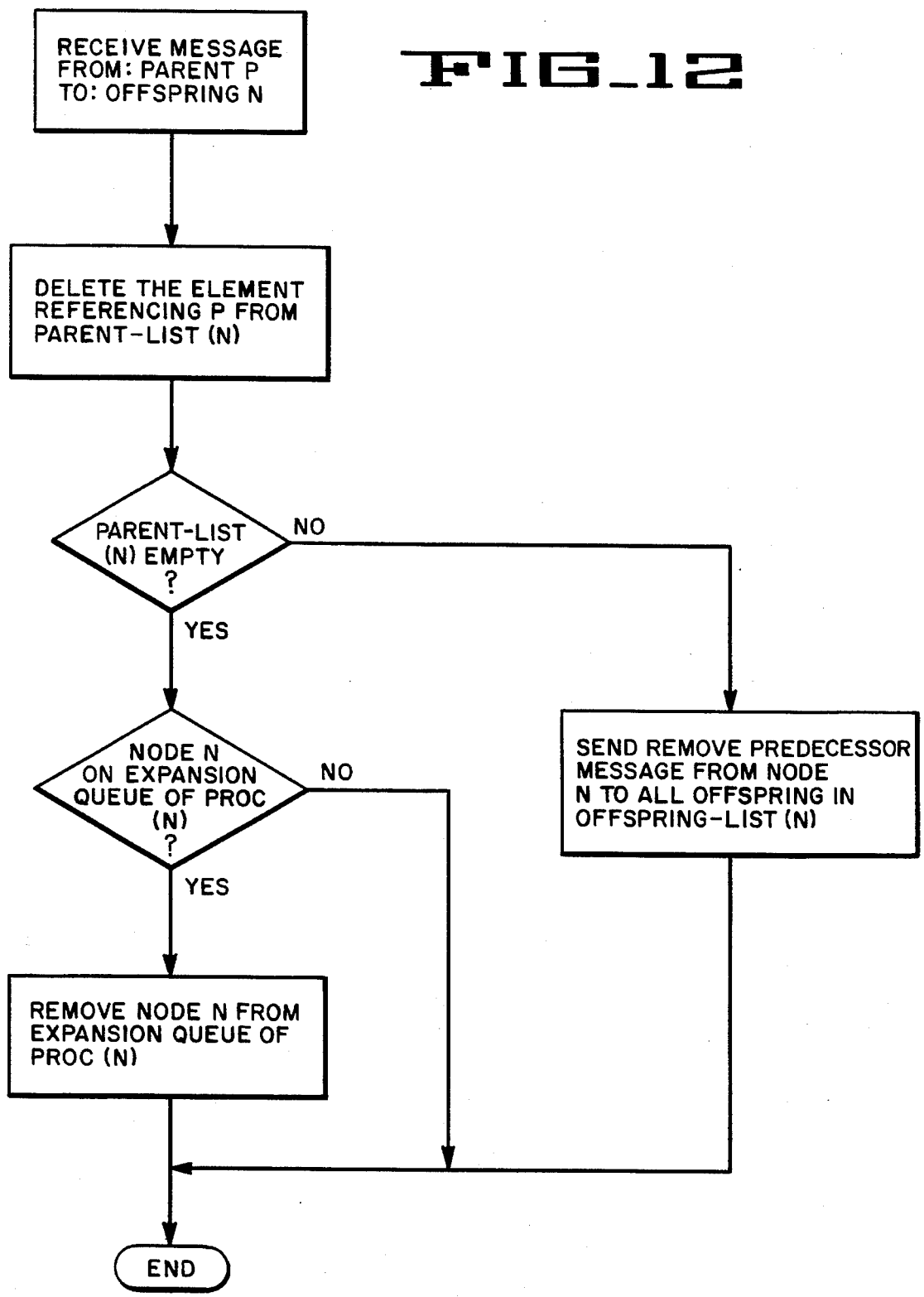

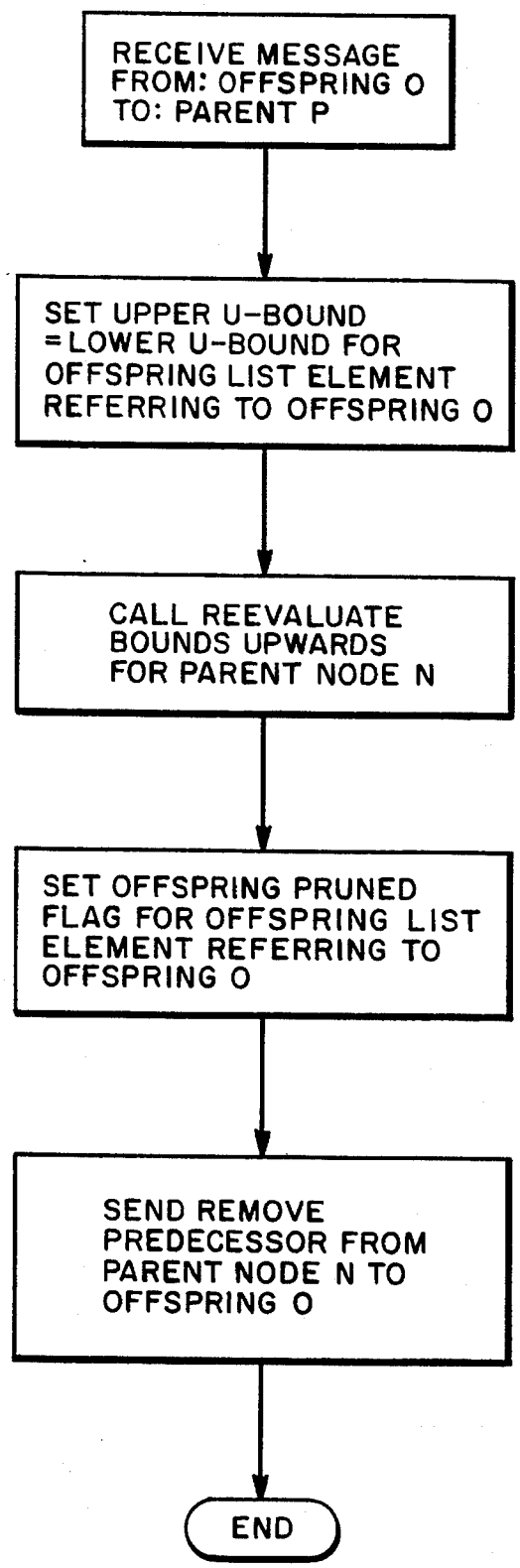
FIG_13

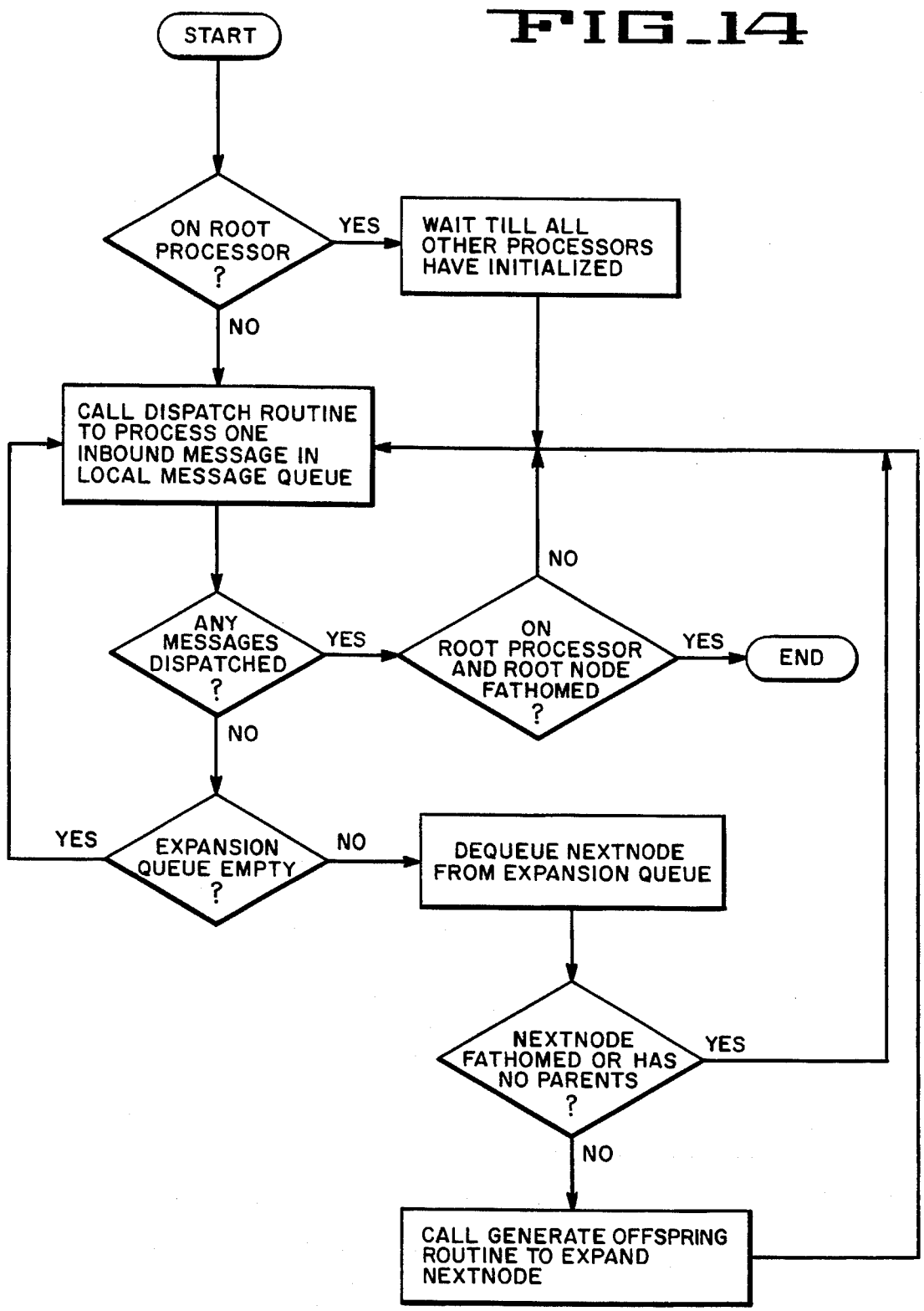
FIG_14

METHOD FOR SOLVING ENUMERATIVE SEARCH PROBLEMS USING MESSAGE PASSING ON PARALLEL COMPUTERS

This application is a continuation of application Ser. No. 07/478,324, filed Feb. 12, 1990, now abandoned.

BACKGROUND OF THE INVENTION

This invention relates to methods of operating digital computers and, more particularly, to a method of operating a plurality of digital processors to solve enumerative search, graph search or combinatorial optimization problems.

Practical enumerative search, graph search or combinatorial optimization problems occur in a variety of fields including various engineering disciplines, management and econometrics. Such problems are characterized in that their solution consists of identifying the optimum combination of individual choice selections from among a multitude of possibilities. Examples of such enumerative search, graph search or combinatorial optimization problems include: determining the best move in a game of chess or checkers, determining which articles of different values and sizes should be packed into a container of limited capacity in order to maximize the total value of the container's contents, and determining the optimum scheduling of operations in a manufacturing facility to maximize profitability.

In principle, such enumerative search, graph search or combinatorial optimization problems can be solved by testing all possible combinations of choices against each other and selecting the combination giving the most favorable result. However, in anything other than the most simple problems, the number of possible combinations or choices rapidly becomes so large that, even when digital computers are employed, the solution of a single problem on a single processor might take hours or many days. Although such a delay might be unimportant when the problem conditions are stable and the solution to a particular problem can be worked out well in advance of actual need, a number of practical situations require that a solution be determined quickly in the face of rapidly changing data. For example, determining the optimum launch schedules for surface-to-air missile engagements in naval anti-air craft warfare requires that a solution be determined in the brief interval between the initial detection, and final arrival, of enemy forces.

One known approach to reducing the time required to solve an enumerative search, graph search or combinatorial optimization problem involves the use of several computers or "parallel processors" working simultaneously to solve the problem. In theory, a problem taking 24 hours to solve on a single processor, for example, should be solvable in 1 hour using 24 parallel processors. In practice, however, the need to provide for communication and/or other coordination between individual processors limits how much actual, additional, problem solving ability or capacity each processor can bring to bear on the problem. Typically, as the size of the problem and the number of processors grows, more and more time is taken up for communications, synchronization of processors, starting up processors, and, searching, unecessarily, certain solution paths. Thus, the marginal utility of each additional processor drops until an upper limit on actual problem solving capacity is reached, i.e., at some point the full capacity of each additional processor is needed entirely for "overhead" purposes, and no additional problem solving capacity is added to the system as a whole. This effectively limits the speed with which a problem of given size can be solved.

Numerous parallel processor architectures based on a wide spectrum of design philosophies have been developed and sold. However, there is presently no commercially available hardware and/or software for solving general enumerative search problems in a multiprocessor environment. Software systems designed to run on specific processor architectures for solving specialized enumerative search, graph search or combinatorial optimization problems have appeared. These systems are designed specifically for solving integer programs on BBN Butterfly equipment and solving logic programs (e.g., Prolog). None of the techniques and/or approaches are in any way related to the techniques which form the basis for the present invention.

Numerous hardware/software systems and machines have been either developed or proposed within the academic community for solving specialized cases of enumerative search, graph search or combinatorial optimization algorithms in a multiprocessor environment. As in the case of the commercially available products, these systems are usually adapted to the particular subclass of problems that is being addressed. Recently, work has been published, and hardware/software systems, techniques and methodologies have been developed, for general combinatorial optimization problems. This appears to be a growth area in the academic community, but no commercial products resulting from this work have appeared to date. Results reported from these studies indicate, however, that these approaches do not achieve the same level of generality as the present invention. Also, for most previous approaches to this problem, the marginal utility rapidly approaches zero for added loosely coupled processors for a fixed size problem, thereby imposing an absolute limit on the size of the problem that can be treated.

In view of the foregoing, it is a general object of the present invention to provide a new and improved method and apparatus for operating parallel digital processors to solve enumerative search, graph search or combinatorial optimization problems.

It is a further object of the present invention to provide a new and improved method of operating parallel digital processors that is general in its applicability and effectiveness and can thus be used to solve a wide range of enumerative search, graph search or combinatorial optimization problems.

It is a still further object of the present invention to provide a method of operating parallel digital processors to solve enumerative search, graph search or combinatorial optimization problems wherein each processor, regardless of how many, provides at least a minimum marginal utility so that an enumerative search, graph search or combinatorial problem of any given size can be solved within any non-zero time period through the addition of an appropriate number of processors.

SUMMARY OF THE INVENTION

The invention provides a method and apparatus for operating a plurality of digital processors so as to solve an enumerative search problem of the type wherein the value of a root node is to be ascertained, the root node being dependent upon a plurality of interrelated successor nodes. The method comprises the steps of distributing the successor nodes among the plurality of digital processors, expanding the nodes within the digital processors and calculating upper and lower bounds for each of the expanded nodes. The method further comprises the steps of passing the upper and lower bounds upwardly towards the root node, calculating upper and lower root bounds for the root node and passing the upper and lower root bounds downwardly towards the successor nodes.

The invention also provides a method and apparatus for operating a plurality of digital processors so as to solve an enumerative search problem of the homogeneous type wherein a root node, interdependent on a plurality of successor nodes, is to be determined and wherein the successor nodes are either maximizing or minimizing. The method comprises the steps of distributing the successor nodes among the digital processors, expanding the nodes in the plurality of digital processors, and computing bounds for each of the nodes. The method further comprises the steps of comparing the bounds against each other to ascertain a best bound and broadcasting the best bound among the successor nodes.

The invention also provides a method and apparatus for operating a plurality of digital processors so as to solve an enumerative search problem of the type wherein the value of a root node is to be ascertained, the root node being dependent on a plurality of interrelated successor nodes. The method comprises the steps of distributing the successor nodes among the plurality of digital processors, expanding the nodes within the digital processors, and calculating upper and lower bounds for each of the expanded nodes. The method further comprises the steps of determining which of the expanded nodes are not on the solution path and sending a remove successor message to the expanded nodes not on the solution path.

The invention also provides a method and apparatus for operating a plurality of digital processors so as to solve an enumerative search problem of the type wherein the value of a root node is to be ascertained, the root node being dependent on a plurality of interrelated successor nodes. The method comprises the steps of distributing the successor nodes among the plurality of digital processors, expanding the nodes within the digital processors and calculating upper and lower bounds for each of said expanded nodes. The method further comprises the steps of passing the upper and lower bounds downwardly among the successor nodes, recalculating the upper and lower bounds and generating a re-evaluate bounds downward message for passing the recalculated upper and lower bounds downwardly among the successor nodes.

BRIEF DESCRIPTION OF THE DRAWINGS

The features of the present invention which are believed to be novel are set forth with particularity in the appended claims. The invention, together with the objects and advantages thereof, can best be understood by reference to the following description taken in conjunction with the accompanying drawings wherein like reference numerals identify like elements and wherein:

FIG. 1 is a diagramatic depiction of a sample enumerative search, graph search or combinatorial optimization problem useful in understanding the operation of the present invention.

FIG. 2 is a diagramatic depiction of one operation of the method useful in understanding operation of the method in a "re-evaulate bounds" mode.

FIGS. 3A, 3B, 4, 5A, 5B, 6A, 6B, 7–8, 9A, 9B, 10A, 10B, 11A, 11B, and 12–14 are flowchart diagrams of one program for carrying out the method of the present invention and are useful in understanding the operation thereof.

DESCRIPTION OF THE PREFERRED EMBODIMENT

The invention provides a generalized method of operating a plurality of digital processors to solve the broad category of enumerative search, graph search or combinatorial optimization problems. Enumerative search or graph search is a well established concept which is discussed in textbooks such as Aho, Hopcroft, and Ullman, *Data Structures & Algorithms,* Addison-Wesley Reading, Mass. 1983. As used herein, enumerative search problems are characterized as having the following components:

1. A finite directed, acyclic graph (DAG) G=(V, E) with a node set V and edge set E. The directed acyclic graph defines a partial order on the elements of the node set, V. In G if there is a directed edge, or arc from an element in $V_1$ with $V_2$ then $N_1$ is said to be a predecessor or a parent of $N_2$, and $N_2$ is said to be a successor or offspring of $N_1$. Nodes with no successor are called terminal or leaf nodes. Nodes with no predecessor are called root nodes. The set V is referred to as the state space of the problem. The distinguishing characteristics of an element N within V is called state of the node V.

2. A rule which assigns a value to each leaf node as a function of its state, and a rule which assigns value to a non-leaf node as a function of the values of its successors.

3. A rule or procedure for generating the set of successors, SUCC (N) of a Node in the state space.

Typically, an enumerative search, graph search or combinatorial optimization process starts with either a set of root nodes or a single root node from which the entire state space, or some relevant subset of the space, is generated. It should be recognized that those problems that start with a set of root nodes can be reduced to an equivalent problem starting with a single root node. Accordingly, in the discussion that follows, it will be assumed, without loss of generality, that the enumerative search, graph search or combinatorial optimization problems to be solved each start with a single root node.

A further assumption is that there exists a rule or procedure for generating an upper bound or limit and/or a lower bound or limit on the actual value of each node N as soon as it is generated. The upper and lower bounds become further and further constrained through time as the process proceeds. As such, the upper bound is a non-increasing function of time, while the lower bound is a non-decreasing function of time.

An illustrative example of an enumerative search, graph search or combinatorial optimization problem, useful in understanding the terminology described above, is set forth in the "sample knapsack problem" illustrated in FIG. 1. In the sample knapsack problem, it is assumed that the capacity of a knapsack is 5 pounds and that it is desired to load the knapsack with various items of differing weights and values so as to maximize the value of the loaded knapsack without exceeding its capacity. In the sample knapsack problem, five items, A through E, have values, weights and value/weight ratios as follows:

| Items | Value | Weight | Value/Weight |
|-------|-------|--------|--------------|
| A | 41.4 | 0.8 | 53.1 |
| B | 68.7 | 1.6 | 43.6 |
| C | 43.9 | 4.9 | 9.0 |
| D | 83.6 | 11.5 | 7.3 |
| E | 83.1 | 12.3 | 6.7 |

A basic approach to solving the problem is to begin with an empty knapsack and to add items in the order of their value/weight ratios (maximum to minimum). For each item, there are two possible choices, i.e., put the item in the knapsack or leave it out.

In FIG. 1, nodes 0 through 24 represent the state space of the problem. Node 0, representing the empty knapsack prior to the addition of any item, is a root node. Nodes 1 through 24 are successor nodes. Nodes 1 and 2 are the offspring of node 0 (node 0 is the parent node of nodes 1 and 2) while nodes 3 through 6 are the offspring nodes of nodes 1 and 2 (nodes 1 and 2 are the parents of nodes 3 through 6).

The state space is developed by considering each item separately and deciding whether to add the item to, or eliminate the item from, the knapsack. In FIG. 1, the addition of an item is indicated by the leftwardly directed downwardly sloping lines. The decision to eliminate a particular item is represented by a rightwardly directed, downwardly sloping line. Accordingly, with respect to item A, for example, node 1 represents the addition of item A to the knapsack, while node 2 represents the decision to withhold the addition of the item to the knapsack. Similarly, node 3 represents the addition of items A and B to the knapsack, node 4 represents the addition of only item A but not item B to the knapsack, node 5 represents the decision to add only item B to the knapsack and node 6 represents the decision to add neither item A nor item B to the knapsack.

The upper and lower bounds are initially set to plus and minus infinity. However, at any given node, there is sufficient information to determine non-infinite limits between which the optimum total value (the solution to the problem) will lie. For example, at node 0, non-infinite upper and lower bounds can be determined by adding items to the knapsack in the order of their value/weight ratios and noting which item results in the capacity of the knapsack being exceeded. At this point, the non-infinite lower bound will be equal to this total value less the value of the last item added, while the upper bound will be the total of these items including the last item added. In the sample problem, the lower bound is 110.1 (the sum of the values of items A and B) while the upper bound is 154.0 (the sum of the values of items A, B and C).

An important concept that can be recognized by reference to FIG. 1 is that of "pruning." By this is meant the process of avoiding generation of those portions of the state space that can be rapidly eliminated from consideration as a solution to the problem. For example, node 7, which represents the addition to the knapsack of items A, B and C, results in a total weight in excess of the capacity of the knapsack. Accordingly, any combination of items which includes items A, B and C can be automatically eliminated from further consideration. To effect the pruning process, it is desirable, in accordance with one aspect of the invention, to pass bounds information in both directions along the search graph, i.e., towards and away from the root node.

An important feature of the present invention is that the enumerative search, graph search or combinatorial optimization problem is solved through utilization of two or more parallel digital processors. In the sample knapsack problem illustrated in FIG. 1, two parallel processors are utilized and, in this particular example, even numbered nodes are evaluated or "hosted" on the first processor (processor no. 1). The odd numbered nodes are evaluated or hosted on the second processor (processor no. 2).

The present invention provides a method of operating a plurality of parallel digital processors so as to expand the state space (or some relevant part of the state space), prune alternative branches that can be ruled out because of the associated upper and lower bounds, and back up values toward the root node. At any point in time, the set of nodes that have been generated is referred to as the current search graph or search tree as appropriate.

Each processor hosts, or is responsible for, a certain subset of the nodes in the search graph, meaning that the processor is responsible for maintaining the values and/or upper or lower bounds associated with every node it hosts. Nodes are distributed to the processors using a hashing function wherein the state of a given node is supplied as an input, and the processor assigned responsibility for the node is generated as an output.

In generating a solution to an enumerative search, graph search or combinatorial optimization problem, the method of the present invention requires expansion of the state space through expansion of the current tip nodes. Expressed differently, generation of the state space involves consideration of the next level of possible alternatives in the solution of the problem. To provide for generation of the state space, a graph generation subsystem is provided in combination with a message system.

The graph generation system comprises a process that runs independently on each processor. The process requires a queue, referred to as the expansion queue, unique to each processor and containing the set of nodes hosted by that processor that have not yet been expanded. The process also includes, for each processor, an additional queue referred to as the message queue that contains the set of all current messages pertaining to nodes being hosted by the given processor. In operation, the state space is generated by unloading a message from the message queue and invoking a proper message handler to handle the message. This process is continued until all messages have been handled. (The particular messages and how they are handled will be described below).

After the messages are handled, a node is selected for expansion from the expansion queue and a set of successors to that node are generated. An "add predecessor" message is generated establishing a link from the particular selected node to the individual successor node. (The "add predecessor" message will be described in greater detail below).

To curtail unnecessary expansion of the entire search graph, "pruning" is utilized to eliminate those branches of the graph that cannot be a solution path to the enumerative problem depending upon the problem at hand. To this end, the method, in accordance with one aspect of the invention, assigns to each node "bounds" between which the solution must lie. Two classes of bounds are utilized, namely upwardly passed bounds (referred to as U-bounds) and downwardly passed bounds (referred to as D-bounds). Each class of bounds, in turn, comprises a pair including an upper bound, below which the solution must lie, and a lower bound, above which the solution must lie. The current upwardly and downwardly passed upper and lower bounds for any node are numbers. Upwardly passed bounds are computed recursively from the bounds of their offspring and the recursive formulation depends on the definition of the specific problem. The actual formulation that is used for a particular problem is controlled by the user. Upwardly passed bounds can be changed only when the node receives a "reevaluate bounds upward" message, and downwardly passed bounds can be changed when the node receives a "reevaluate bounds downward" message.

In accordance with one aspect of the invention, bounds information can be passed or "broadcast" to all nodes through a "global bounds" message. During operation, the upper and lower bounds converge, and a node is said to be "fathomed" when its upwardly passed upper bound is equal to its upwardly passed lower bound. Typically, a solution to the enumerative search, graph search or combinatorial optimization problem is found when the upwardly passed upper bound and upwardly passed lower bound of the root node equal each other.

As mentioned previously, a variety of messages are utilized in the process of the present invention. These messages control the expansion of the state space pruning, and the value of bounds at each node. Associated with each node is a state that is either inactive (pruned) or active. When a node is inactive, it neither sends or receives messages and the node is removed from the expansion queue, if it is on the expansion queue when it becomes inactive. An active node acts fully upon all messages and will eventually be expanded if it is on the expansion queue.

The basic message types are:

1. add predecessor,
2. remove predecessor,
3. add successor
4. remove successor
5. reactivate successor,
6. reevaluate bounds upward,
7. reevaluate bounds downward,
8. global bounds.

The purpose of the "add predecessor" message is to establish a link from the successor (offspring) node to a parent (predecessor) node. If the offspring node is inactive at the time the message is received, it must reactivate itself in order to resume the ongoing process of generating more and more refined upper and lower U-bounds leading eventually to a fathomed node. If the node has not yet been created, then the host processor must create the target node, generate its upper and lower U-bounds, and put it on the expansion queue. These upper and lower U-bounds, as well as an address of the parent in the offsprings parent list, are returned in either an "add successor" or a "remove successor" message. D-bounds are evaluated when bounds are generated in the case of a newly created node, or when the parent is added to the parent list of an existing node. As a result, if a parent is pruned, then a "remove successor" message is sent to the parent. Otherwise, an "add successor" message is sent to the parent.

A "remove predecessor" message is sent from a parent (predecessor) node to an offspring (successor) node when the parent node no longer needs current and updated state information from the offspring node in calculating its current state, where the state of a node is specified by its current upper and lower bounds. This can occur when the parent node has become inactive or when the branch of the search graph rooted at the offspring node has become pruned.

Upon receipt of a "remove predecessor" message, the offspring node removes the link back to the predecessor or sending node. If the offspring node remains active, i.e., it still has a predecessor in the current search graph, then no further action is required. However, removal of the link back to the parent node may reduce message traffic by removing a potential channel along which re-evaluate bounds messages can pass. Otherwise if the list of predecessor links becomes empty as a result of the removal of the link, then the node becomes inactive. It removes itself from the expansion queue if it is on it, or else it sends "remove predecessor" messages to all of its offspring.

An "add successor" message is sent to an offspring (successor node to a parent successor) node in response to an "add predecessor" message from the parent to the offspring. The add successor message acts as a "handshake" for the "add predecessor" message, passing back to the parent node: (1) a physical address of tile offspring node on the host processor, (2) the current upper and lower U-bounds of the offspring node, and (3) the physical address of the parent list structure describing the parent to the offspring.

The "remove successor" message received by a node results from the evaluation of D-bounds offspring. This message indicates that the offspring is not on the solution path and should be removed from consideration. The "remove successor" handler updates the U-bounds contained in the offspring list element of the receiving nodes offspring lists by fathoming the offspring (setting the upper bounds equal to the lower bounds) and then re-evaluating the bounds of the parent. A "remove predecessor" message is sent to the offspring as a consequence of re-evaluating parent bounds.

The purpose of the "reactivate successor" message is to re-establish a link from a successor (offspring) node to a parent (predecessor) node. If the offspring node is inactive at the time the message is received, it must reactivate itself in order to resume the on-going process of generating more and more refined upper and lower bounds, leading eventually to a fathomed node. A node is called fathomed when its upper bound is equal to its lower bound. The reactivated successor is put on the expansion queue if it has not yet been expanded.

The "re-evaluate bounds upward" message indicates to the receiving (parent) node that the U-bounds of the sending (offspring) node may have changed, and hence it is appropriate for the parent to re-calculate its bounds according to a prearranged recursive formulation. The "re-evaluate bounds upward" message is sent when the bounds of an offspring node have changed. This can occur either if the offspring node itself has received a "re-evaluate bounds upward" message, or when the bounds are set for the first time, i.e., when its data structure is established.

The "re-evaluate bounds downward" message is used to propagate downward flowing bounds principally in heterogeneous graphs or trees, e.g., mini-max decision processes. This type of graph or tree is set by the parameters entered by the user. D-bounds are used to promote pruning of nodes located on paths other than that of the originating node. These pruning actions take place when these more or less global bounds are passed downwardly from parent to offspring where a determination is made to sever the link between offspring and parent.

An example of this process for a homogeneous tree is shown in FIG. 2. Node x generates a set of bounds and sends a "re-evaluate bounds upward" message to its parent. The bounds are compared to its existing U-bounds and D-bounds of the parents and are found to be better than both sets of bounds. This triggers two actions. First, a re-evaluate bounds downward message is sent to the sibling of node x. Second, a re-evaluate bounds upward message is sent to the grandparent of node x. Upon re-evaluation of the D-bounds of this node, the downwardly passed bounds are passed to offspring on a different path from node x, while the upwardly passed bounds are passed further up the tree. Continued propagation of the D-bounds results in the evaluation of the bounds of node y. Based upon the downwardly passed bounds ultimately originating from node x, the process determines that node y cannot be on the solution path. A "remove successor" message is generated and sent to the parent node y. The path to a successor node is removed in the same fashion with upwardly passed bounds except in the particular formulation in the message subsystem, the offspring initiates the removal of the parent-offspring link. Specifically, the successor's downwardly passed bounds are used to make decisions of whether to prune some or all of its parents. The end result is that bounds originating on one path are propagated down another path, resulting in a cut off or pruning action which might not have occurred had these bounds not been available.

For homogeneous graph searches, where all nodes are either maximizing or minimizing, global bounds on the solution cost can be used to curtail the size of the search graph. This is accomplished by broadcasting incumbent or global bounds to all processors. As the graph is expanded, the node bounds are generated. A user defined function compares the bound of the expanded node with a local copy of the best found global solution. If the node bound is better than the existing global solution, a global bounds message is sent to all other processors. Otherwise, the bounds for the node are compared with the incumbent solution and can be pruned as part of the re-evaluate bounds upward routine.

The operation of the method of the present invention can be understood by consideration of the solution to the sample knapsack problem illustrated in FIG. 1. Using the message passing conventions described above, the graph expansion and pruning occur as follows:

1. Node 0 on processor 1 is expanded from the expansion queue of processor 1 resulting in the generation of nodes 1 and 2. Node 1 and its ancestors contain Item A. Node 2 and its ancestors do not. Processor 1 sends an "add predecessor" message to the processors hosting nodes 1 and 2, i.e., processors 2 and 1, respectively. Because node 2 is hosted on processor 1, the "add predecessor" message is actually sent from processor 1 to itself.

2. Processor 2 receives the "add predecessor" message and expands node 1. Since node 1 does not at this point actually exist, processor 2 first creates node 1 and adds node 0 to node 1's parent list. The processor then calculates upper and lower bounds and sends an add successor message back to node 0, which is hosted by processor 1, along with the upper and lower bounds. In the example illustrated these upper and lower bounds equal 154.0 and 110.1 respectively, (A+B+C=154.0, A+B=110.1). Node 1 is added to the expansion list of processor 2. Reception of the "add successor" message results in offspring node 1 being added to node 0's offspring list with upper and lower bounds of 154.0 and 110.1, and node 0's bounds are reevaluated according to the bounds reevaluation function. No change in node 0's bounds results.

Similarly, processor 1 expands node 2, creating it, generating bounds, and adding node 0 to the list of node 2 parents. Processor 1 then sends an add successor message to node 0 on processor 1, informing node 0 that it has node 2 as an offspring and that, starting without item A, the knapsack upper and lower bounds are 112.6 and 68.7, respectively (B+C=112.6, B=68.7). Node 2 is added to processor 1's expansion key.

Expansion of node 1 on the expansion queue of processor 2 results in the generation of two add predecessors messages creating nodes 3 and 4 on processors 2 and 1. Processor 2 receives an "add predecessor" message (sent to itself) creating node 3, the offspring of node 1. Node 3 represents Items A and B placed in the knapsack. The bounds for node 3 are 110.1 and 154.0. Next, node 4 on processor 1 is expanding via an "add predecessor" message received from node 1 on processor 2. Node 4 represents the state with Item A in the knapsack, and Items C, D, E and F available. In this case, adding any of the remaining Items C, D, E or F results in exceeding the five pound capacity of the knapsack. Thus, node 4 has no offspring and is fathomed with the value of 41.4, i.e., the value of Item A. A remove successor message is sent from processor 2 to node 1 on processor 1.

Continuing the tree expansion with node 2, offspring nodes 5 and 6 are expanded as "add predecessor" messages are received. Node 5 is hosted on processor 2, and node 6 is hosted on processor 1. Node 5 has bounds of 68.7 and 112.6. These are sent to node 2 on processor 1 in an "add successor" message, and node 5 is added to the expansion queue of processor 2. Receipt of the "add predecessor" message on processor 1 results in the generation of node 6 having upper and lower bounds of 127.5 (value of C+D=127) and 43.9 (value of Item C=43.9). These are sent to node 2 on the same processor (processor 1) via an "add successor" message. Node 6 is added to the expansion queue of processor 1. At this point, three nodes are on the expansion list: 3, 5, (on processor 2) and 6 (on processor 1).

Node 3 is expanded from processor 2's expansion queue yielding nodes 7 and 8. "Add predecessor" messages are sent to the processors hosting nodes 7 and 8. Generation of node 7 occurs upon receiving an "add predecessor" message on processor 2. Node 7 represents the knapsack with Items A, B and C. It is immediately eliminated since it represents a state that is too heavy, i.e. weight exceeds the five pound capacity of the knapsack. Accordingly, a "remove successor" message is sent to node 3 on processor 2. Generation of node 8 occurs upon receiving an "add predecessor" message on processor 1. Node 8 represents the knapsack with Items A and B but not Item C. The bounds for node 8 remain the same, 110.1 and 154.0, as for node 3. An "add successor" message is sent to node 3 on processor 3. Node 8 is added to the expansion list of processor 1.

Expanding node 6 on processor 1's expansion list gives rise to nodes 11 and 12. "Add predecessor" messages are sent to processors 2 and 1. Node 11 represents the knapsack with Item C but without Items A or B. Generation of node 11 upon processor 2's receiving an "add predecessor" message results in a node with bounds of 127.5 (value of b+c) and 43.9 (value of c). An "add successor" message is sent to parent node 6 on processor 1. Node 11 is added to the expansion list of processor 2. Node 12 represents the knapsack without any of Items A, B or C and is eliminated immediately upon receipt of the "add predecessor" message from processor 1 since adding any of the remaining Items results in a weight greater than the five pound capacity of the knapsack. A "remove successor" message is sent from node 12 to node 6 on processor 1.

Next, node 5 is expanded from the expansion list of processor 2, resulting in the creation of nodes 9 and 10. "Add predecessor" messages are sent to processors 2 and 1. Node 9 represents only Items B and C in the knapsack, and because it exceeds the weight limit of the knapsack, node 9 is immediately eliminated as a possibility upon receipt of the "add predecessor" message on processor 2. A "remove successor" message is sent to node 5 on processor 2 resulting in the pruning of node 9. Node 10 consists of Item B with neither Items A nor C. Processing of the "add predecessor" message on processor 1 results in the generation of node 10. The bounds for node 10 are 68.7 (value of Item B) and 112.6 (value of Items B and C). These bounds are conveyed in an "add successor" message from node 10 on processor 1 to node 5 on processor 2. Node 10 is added to the expansion list of processor 1.

At this point, nodes 8, 11 and 10 are available for expansion on the two processors. Expansion of node 8 produces offspring nodes 13 and 14, and "add predecessor" messages are sent to processors 2 and 1. Reception of an "add predecessor" message from node 8 on processor 1 to processor 2 results in the generation of node 13 consisting of Items A, B and D. It is overweight and is thus immediately eliminated. A "remove successor" message is sent to node 8 on processor 1 resulting in the pruning of node 13. After processing the "add successor" message, node 14 is expanded on processor 1 and represents a knapsack containing Items A and B with neither Items C nor D. The upper and lower bounds for this node are 110.1 (value of Items A+B) and 193.2 (value of Items A+B+E). These bounds values are sent to node 8 on processor 1 via an "add successor" message. Node 14 is added to the expansion list of processor 1.

The expansion of node 11 on processor 2 results in the generation of offspring nodes 17 and 18. "Add predecessor" messages are sent to processors 2 and 1. Receipt of the "add predecessor" message on processor 2 (sent to itself) results in the generation of node 17. Node 17 represents Items C and D which exceed the capacity of the knapsack. Node 17 is, therefore, immediately eliminated, and a "remove successor" message is sent to node 11 on processor 1 to prune node 17. Receipt of the "add predecessor" message on processor 1 results in the generation of node 18 consisting of Item C, but not Items A, B or D. Node 18 has bounds of 43.9 (value of Item C) and 127.0 (value of Items C+E). An "add successor" message transmits these bounds to node 11 on processor 2. Node 18 is added to the expansion list of processor 1.

Expansion of node 10 from the expansion list results in the generation of offspring nodes 15 and 16. "Add successor" messages are sent to processors 2 and 1, and receipt of the "add predecessor" message by processor 2 generates node 15 consisting of Items B and D. Node 15 is overweight and is immediately eliminated by sending a "remove successor" message to node 10 on processor 1. Processor 1 receives an "add predecessor" message and generates node 16. Node 16 consists of Item B and none of Items A, C or D. Node 16 has bounds of 68.7 (value of Item/B) and 151.8 (value of Items B+E). These bounds are sent to node 10 on processor 1 via an add successor message. Node 16 is added to the expansion list of processor 1.

At this point, nodes 14, 16 and 18 are available for expansion and such expansion takes place on processor 1. The expansion queue of processor 2 is empty, and processor 2 is idle. This is an artifact of the hashing function that distributes even numbered nodes to processor 1 and odd numbered nodes to processor 2. Although this particular hashing function has been used in the sample knapsack problem, it will be appreciated that other hashing functions can also be utilized.

From this point, node expansion from the expansion queue proceeds as before with "add predecessor" messages being sent to the proper processors and either "remove successor" or "add successor" messages being sent to the parent node. If a node is not eliminated from consideration, it is placed on its host processor's expansion queue. The expansion of the tree up to this point has not resulted in a change in parental bounds when bound values are received via an "add successor" message. This "backing up" of bounds or values occurs when the generation of node 20 triggers the backing up of values through a series of "remove successor" messages eventually reaching the root node.

The tree expansion continues as before. Expansion of node 14 results in nodes 19 and 20. Node 19 consists of Items A, B and E and neither of Items C nor D. Node 19 is immediately eliminated and pruned by reason of the weight constraint. Node 20 consists of Items A and B with none of Items C, D or E. It is a tip node (no other Items are left to be considered) and has a value of 110.1. Node 20 is "fathomed" resulting in a "remove successor" message being passed back to the parent of nodes 20 and 14. Upon receipt of this message by node 14, its bounds are reevaluated and are found to be 110.1 and 110.1, which results in the fathoming of node 14. A "remove successor" message is sent to parent node 8, which, in turn, causes node 8 to reevaluate its bounds setting them to 110.1 and 110.1. This process continues until node 1 is fathomed, returning its value to the root node.

Next, node 16 is expanded to generate nodes 21 and 22. Node 21 consists of Items B and D and none of Items A, C or E. Node 21 is immediately eliminated and pruned due to the weight constraint. Node 22 is a tip node consisting of Item B, and its value is 68.7. This value is backed up to node 2 by successive "remove successor" messages.

Finally, node 18 is expanded to give nodes 23 and 24. Node 23 consists of Items C and E and is overweight and pruned. Node 24, a tip node, represents a solution consisting solely of Item C and is fathomed with a value of 43.9. This value is backed up through remove successor messages to reach node 2. Node 2 is fathomed with a value of 68.7, the value of its offspring node 5. A remove successor message from node 2 triggers the re-evaluation of bounds on the root node, node 0. The root node is fathomed with the value of 110.1 derived from the backed up cost of offspring node 1. At this point, the value of the root node is known, and the process terminates.

The method of the present invention is preferably carried out using two or more suitably programmed parallel digital processors. FIGS. 3–15 are flowchart diagrams illustrating the internal logic structure of one such program suitable for implementing the process of the present invention. In addition, an appropriate program is contained in the software appendix forming a part of this specification.

The method and apparatus of the present invention offer significant commercial advantages over prior systems. Of fundamental importance is that the method and apparatus enable each processor of a multiple processor system to provide additional, actual, problem solving capability. Thus, the speed with which the system can solve complex problems is limited only by the number of available processors. Furthermore, the method and apparatus, being generic in approach, make it possible to solve a broad range of enumerative search problems without significant program customization. This makes it possible to utilize one program in a variety of settings ranging from business to engineering to military applications.

While a particular embodiment of the invention has been shown and described, it will be obvious to those skilled in the art that changes and modifications can be made therein without departing from the invention in its broader aspects and, therefore, the aim in the appended claims is to cover all such changes and modifications as fall within the true spirit and scope of the invention.

What is claimed is:

1. A method for solving enumerative search problems using message passing on parallel processors wherein a value of a root node is to be ascertained, the root node being dependent upon a plurality of interrelated successor nodes, having tips with directed edges comprising the steps of:

generating the interrelated successor nodes to develop a state space;

expanding said state space through expansion of the tips with directed edges of the interrelated successor nodes;

distributing the interrelated successor nodes among a plurality of digital processors;

assigning nodes to at least one of said processors by means of a hashing function;

expanding said assigned nodes utilizing an expansion queue;

generating application specific criteria;

pruning excess nodes in compliance with said application criteria utilizing a message queue; and eliminating generation of said state space by passing results of said pruning towards and away from the root node.

2. The method according to claim 1 wherein said step of pruning excess nodes includes utilizing re-evaluate bounds upward message.

3. The method as defined in claim 1 wherein said step of pruning excess nodes includes utilizing re-evaluate bounds downward message.

4. The method as defined in claim 1 wherein the pruning of excess nodes includes a process of avoiding generation of portions of said state space that can be rapidly eliminated from consideration as a solution to the enumerative search problem and further each of said portions of said state space is associated with a node which when pruned becomes inactive and therefore does not send and does not receive message sand the node is removed from said message queue.

5. A method for solving enumerative search problems of the homogenous type using message passing on parallel processors wherein a value of a root node, dependent upon a plurality of interrelated successor nodes having tips with directed edges is to be determined and wherein said successor nodes are either maximizing or minimizing said method comprising the steps of:

generating the interrelated successor nodes to develop a state space;

expanding said state space through expansion of the tips of the interrelated successor nodes;

distributing the interrelated successor nodes among a plurality of digital processors;

assigning nodes to at least one of said processors by means of a hashing function;

expanding said assigned nodes utilizing an expansion queue;

generating application specific pruning criteria;

pruning excess nodes in compliance with said application specific criteria by utilizing a message queue;

developing bounds for each node wherein an upper and a lower bound are determined and said upper and lower bound become continuously constrained through time;

utilizing global bounds to curtail the size of the search problem by broadcasting said global bounds to all the parallel processors;

comparing said upper and lower bounds against each other to ascertain a best bound; and broadcasting said best bound among the successor nodes in the plurality of digital processors.

6. The method as defined in claim 5 wherein said step of pruning excess nodes includes passing results upwardly towards and downwardly from the root node by means of re-evaluate bounds upward and downward message and said upwardly passed bounds can be changed only when the root node receives a "re-evaluate bounds upward" message; and said downwardly passed bounds can be changed only when the root node generates a "re-evaluate bounds downward" message.

7. The method as defined in claim 5 wherein said step of assigning nodes includes using said hashing function provision of a state of a given node as an input and the processor assigned to the node being generated as an output; each of the processors hosting a certain subset of the nodes in the search problem to thereby maintain values pertaining to a pair of upper and lower bounds for each node hosted.

8. A method for solving enumerative search problems using message passing on parallel processors wherein a value of a root node is to be ascertained, the root node being dependent upon a plurality of interrelated successor nodes, having tips with directed edges said method comprising the steps of:

generating the interrelated successor nodes to develop a state space;

expanding said state space through expansion of the tips of the interrelated successor nodes;

distributing the interrelated successor nodes among a plurality of digital processors;

assigning nodes to at least one of said processors by means of a hashing function;

expanding said assigned nodes utilizing an expansion queue;

generating application specific pruning criteria;

pruning excess nodes in compliance with said application utilizing a message queue;

preserving remaining nodes and backing up values toward the root node;

expanding the remaining nodes within the digital processors;

generating bounds for said remaining nodes expanded in the digital processors;

determining which of said expanded remaining nodes lie outside the solution path; and removing the expanded remaining nodes which are not on the solution path.

9. The method as defined in claim 8 wherein said assigning nodes among the digital processors further includes having each of the processors hosting a certain subset of the nodes in the search problem to maintain values pertaining to a pair of upper and lower bounds for each node hosted.

* * * * *